INVENTORS
HUGH D. MAC DONALD, JR.
RICHARD H. BAGWELL

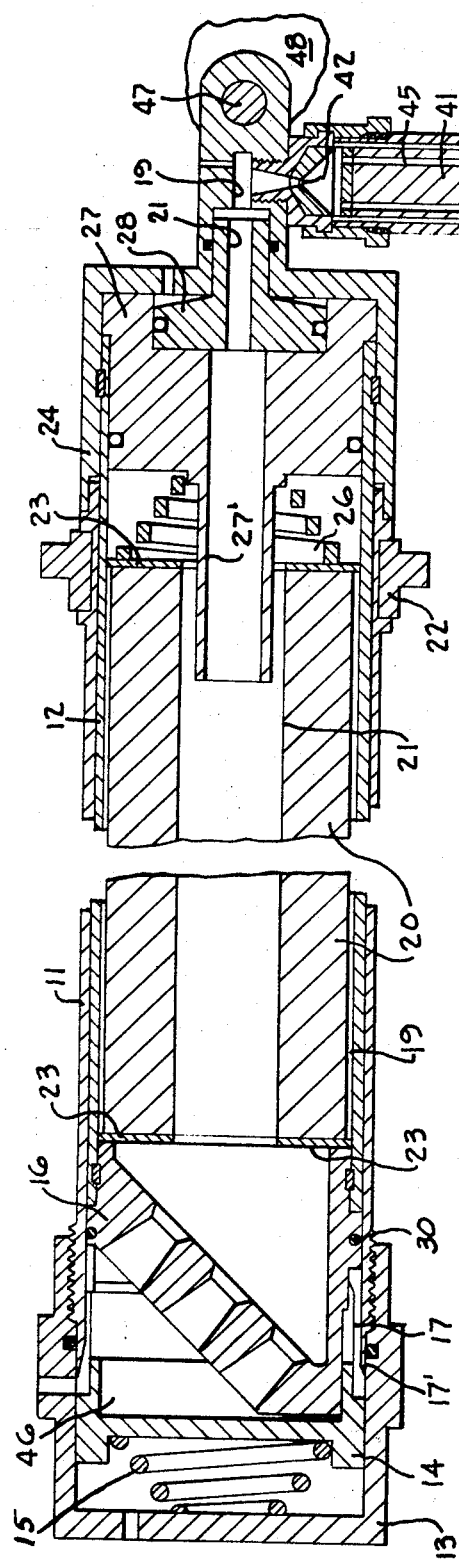
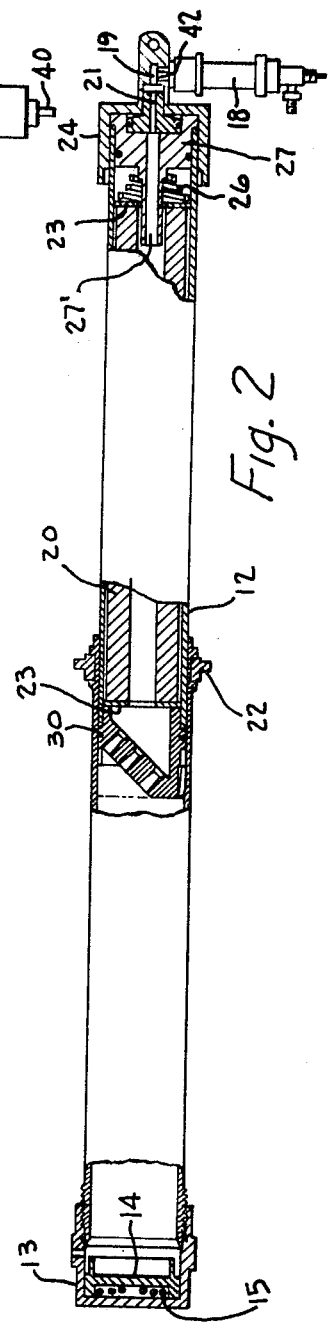
Fig. 1
Fig. 2
INVENTORS
HUGH D. MAC DONALD, JR.
RICHARD H. BAGWELL
ATTORNEYS

BY: Harry M. Saragovitz,
Edward J. Kelly, Herbert Berl &
S. Rubroff
ATTORNEYS.

United States Patent Office 3,447,767
Patented June 3, 1969

3,447,767
ROCKET CATAPULT
Hugh D. MacDonald, Jr., Cinnaminson County, N.J., and Richard H. Bagwell, Philadelphia County, Pa., assignors to the United States of America as represented by the Secretary of the Army
Filed Aug. 1, 1966, Ser. No. 569,521
Int. Cl. B64d 25/10
U.S. Cl. 244—122         4 Claims

ABSTRACT OF THE DISCLOSURE

A man-seat ejection arrangement for emergency escape from an aircraft having secured thereto a launching tube that telescopingly receives a rocket tube. The rocket tube carries a forwardly located man-seat securing means, has a rearward nozzle portion and outwardly adjacent thereto, releasable latching fingers that normally latch the rocket tube against forward movement relative to the launching tube. Tubular propellant carried by the rocket tube has its inner, outer and end surfaces completely covered with an inhibitor coating that controls rocket ignition from a body of solid propellant having plural longitudinal passages and located within a gas generator housing threadedly secured to a forward portion of the rocket tube. The gas generator housing has a nozzle throat portion in fluid communication with the coating of the tubular propellant inner surface.

---

This invention relates to ejection apparatus and, more particularly to emergency man-seat ejection apparatus for aircrafts.

More specifically, the invention is directed to means for separating the catapult or booster stroke from the rocket or sustainer phase and controlling the proper ignition sequence without resorting to complex unlatching devices, flow control valves, or similar moving metal parts.

It is an object of the invention to provide aircraft seat ejection apparatus having a minimum overall rocket assembly size and weight for a given total amount of propellant.

Another object of the invention is to provide such ejection apparatus having a maximum thermodynamic efficiency and the minimum chance for malfunction.

A further object of the invention is to provide such ejection apparatus having simplified assembly procedures and rocket nozzle construction, as well as a minimum number of moving metal parts.

These and other objects, features and advantages will become more apparent from the following description and accompanying drawings in which:

FIG. 1 is a longitudinal sectional view partially broken away, of an aircraft man-seat ejection unit embodying the principles of the invention.

FIG. 2 is a view similar to FIG. 1 with the rocket at an intermediate stage of launch.

Figure 3:
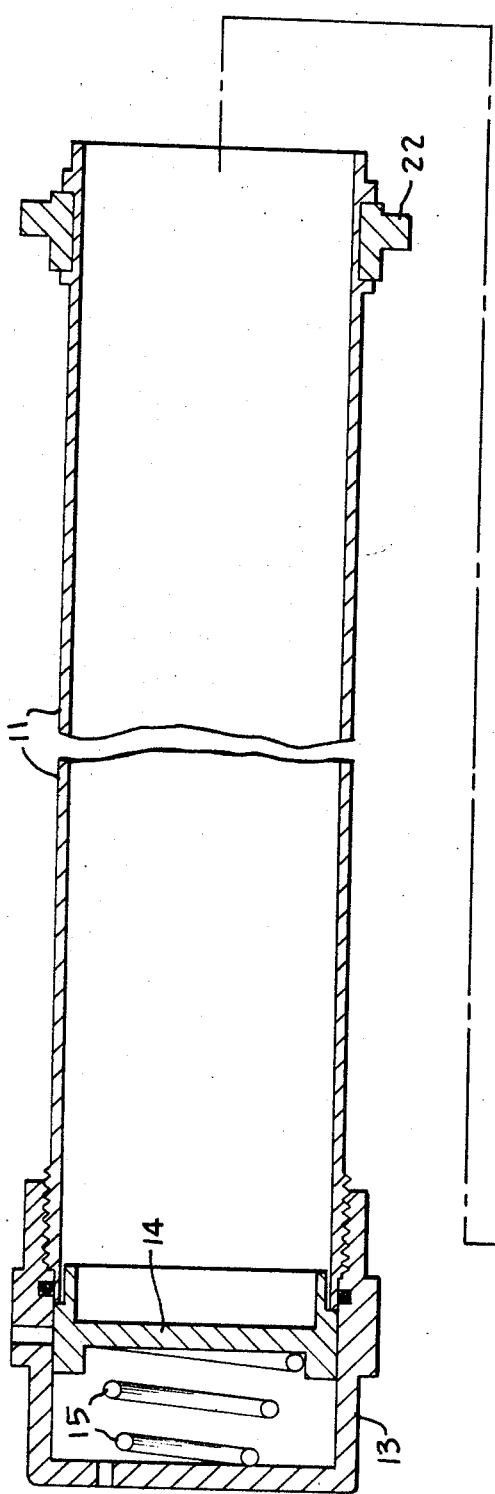
FIG. 3 is a view similar to FIG. 2 with the rocket having departed from the launching tube.
Figure 3:
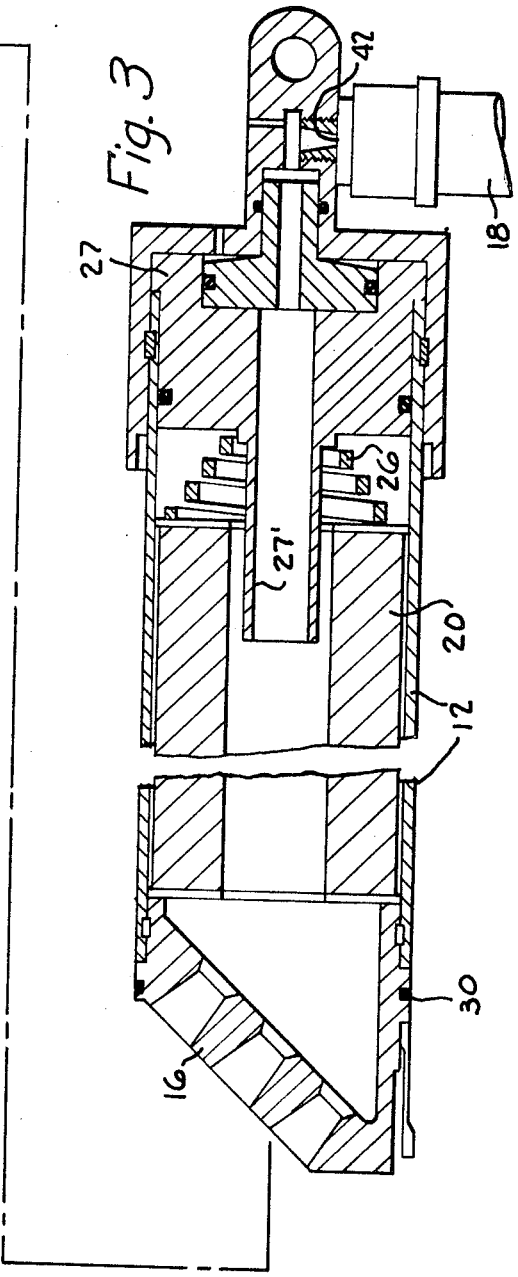

As seen in FIG. 1, the forward end of the rocket tube head closure 24 is appropriately apertured as a trunnion to receive a securing or fastening member 47 of the aircraft man-seat member 48. The rocket tube 12 is telescopingly received in a launching tube 11 that is suitably secured to an aircraft frame by a rearward breech member 13 and a forward trunnion means 22.

Preferably, the rocket motor tube 12 has an inclined rearward exhaust nozzle 16 provided with a plurality of spaced ports. Means in the form of releasable latching fingers 17 carried by an outer portion of the nozzle 16 normally lock the rocket tube against forward movement relative to the launching tube 11. For this purpose an appropriately flanged, forward and rearward opening can 14 is biased forwardly by compression spring 15 to urge fingers 17 outwardly for engaging the rearward face 17' of tube 11 when the rocket tube nozzle is seated rearwardly against the can 14.

Tubular rocket propellant 20, in the form of an elongated annulus extending the major length of tube 12, has its entire surface portions covered with an inhibitor coating in a manner to be described and is biased rearwardly against nozzle 16 by an appropriate spring 26 surrounding a necked down conduit portion 27' of booster cylinder 27 that extends rearwardly into the central passage of tubular propellant 20. It is contemplated that the inner surface of tubular propellant 20 may be formed with longitudinal grooves or ribs and that a transverse section would exhibit the shape for a star, stator, rosette or wagon wheel.

A gas generator 18, preferably ignited by an electric ignition element 40, has its delivery port or throat portion 42 suitably connected to a forward portion of the rocket head 24 and in fluid communication with conduit 27'. Igniter material 43, when lit by element 40, ignites the generator propellant grain 41 whose mass rate of generated gas discharge is controlled by the instantaneous ratio of grain surface 44 to the area of throat 42 in conjunction with the employed propellant burning rate characteristics.

In the operation of the seat ejection unit, gas output from grain port 45 of generator 18 is ducted through central passages 19, 21 in rocket head 24 and mushroom shaped connector 28, through the central passage of inhibitor coated rocket propellant 20 via conduit 27', and rearwardly out of nozzle 16 to pressurize the initially compact area 46. This will cause rearward movement of can 14 (FIG. 2) against the partially compressed spring 15 to unlock or release the resilient rocket to launch tube latching fingers 17 permitting gas pressure developed in chamber 46 to move or catapult the rocket tube assembly forward toward the muzzle end of launching tube 11, with nozzle 16 and its O-ring 30 functioning as a sealing piston. The launching assembly transmits the reaction force through can 14, breech 13, launch tube 11 and trunnions 22 to the aircraft.

The aforementioned generator components, nozzle throat area 42, grain surface 44 and propellant burning characteristics are combined in such a manner to produce an exact force-time curve as required by physiological limitations to an exactness and piezometric efficiency not achievable heretofore.

The main rocket grain assembly is composed of base propellant 20, which preferably is of a solid composition to minimize the effect of ambient or stored temperature variation, propellant inner surface coating 21 which inhibits the surface of the main grain, its external inhibitor 19 and end inhibitors 23. Passage of generated gas over the propellant inner surface coating 21 causes the coating to be consumed, with the products of combustion contributing to the propulsive force of the generator gas in various degrees depending on the composition of coating 21. When such contribution of the inhibitor gas is of a relatively higher degree, the output of the generator 18 can be adjusted or reduced so that the unit remains within the physiological limits.

Preferably, the main grain propellant is of a double base type having a burning rate characteristic of approximately 0.4 in./sec. at 1000 p.s.i. and 1.2 in./sec. at the desired rocket operational pressure of 3000 p.s.i.

An example of a propellant coating which does not contribute to propulsion is ethyl cellulose deposited from a 5% solution of ethyl cellulose dissolved in a lacquer of 31–35% ethyl lactate by volume and the balance of normal butyl acetate. An example of a coating which does contribute to propulsion, with certain conditions within the gas generator having been altered, is X9 propellant deposited from a 10% solution of X9 propellant dissolved in a lacquer of 31–35% ethyl lactate by volume and the balance of normal butyl acetate, where the X9 propellant has a burning rate of approximately 0.1 in./sec. at 1000 p.s.i. A further example of an even more propulsion contributive coating, with the gas generator appropriately modified, is X16 propellant deposited in a similar manner, where the X16 propellant has a burning rate of approximately 0.2 in./sec. at 1000 p.s.i.

Preferably, the gas generator propellant 41 is of the same type as the rocket propellant, but provided with a plurality of longitudinal through perforations 45. For a given length of generator propellant 41, three (3) perforations gave satisfactory performance with the rocket propellant ethyl cellulose coating. In other cases, seven (7) perforations performed satisfactorily.

When the nozzle 16 reaches the muzzle of the launch tube 11 (FIG. 2) the main propellant grain 20 is exposed by consumption of the propellant coating 21 and is ignited by the generator gases flowing through conduit 27'. The precise timing of main grain ignition is a function of the coating composition, thickness and distribution in conjunction with the shape of the main grain perforation or central passage and with the velocity and composition of the generator gas.

Since the burning rate of the main grain 20 is higher than the burning rate of coating 21, the unit is converted from operation as a piston to operation according to well known rocket principles at precisely the correct instant (FIG. 3) for providing continued impulse to the ejected man-seat mass until burn out.

We claim:
1. In a man-seat ejection unit for emergency escape from an aircraft having a launching tube secured to said aircraft and a rocket tube telescopingly received in said launching tube and having man-seat securing means at a forward end thereof, said rocket tube having a rearward nozzle portion and outwardly adjacent thereto means, including releasable latching fingers normally latching said rocket tube against forward movement relative to said launching tube, tubular propellant carried by said rocket tube and extending from adjacent said nozzle portion a substantial distance forwardly therefrom, said tubular propellant having its inner, outer and end surfaces completely covered with an inhibitor coating, a gas generator housing threadedly secured to a forward portion of said rocket tube and having a nozzle throat portion in fluid communication with the coating of said tubular propellant inner surface, a body of solid propellant within said gas generator housing and having a plurality of apertures extending longitudinally therethrough.

2. The structure of claim 1 wherein the coating of said inner surface comprises ethyl cellulose deposited from a 5% solution of ethyl cellulose dissolved in a lacquer of 31–35% ethyl lactate by volume and the balance of normal butyl acetate.

3. The structure in accordance with claim 1 in which the tubular rocket propellant is of a double base type having a burning rate of 0.4 in./sec. at 1000 p.s.i. and 1.2 in./sec. at 3000 p.s.i.

4. The structure of claim 3 wherein the coating of said inner surface comprises a propellant having a range of burning rate of 0.1 to 0.2 in./sec. at 1000 p.s.i., said coating propellant being deposited from a 10% solution of selected propellant dissolved in a lacquer of 31–35% ethyl lactate by volume and the balance of normal butyl acetate.

References Cited

UNITED STATES PATENTS

| | | | |
|---|---|---|---|
| 2,643,611 | 6/1953 | Ball | 102—103 |
| 2,956,401 | 10/1960 | Kane | 60—250 |
| 3,035,796 | 5/1962 | Glass. | |
| 3,115,320 | 12/1963 | Hirt. | |
| 3,158,061 | 11/1964 | Lager | 60—250 |
| 3,166,896 | 1/1965 | Breitengross et al. | 102—103 X |
| 3,283,510 | 11/1966 | Mangum et al. | 60—250 |

OTHER REFERENCES

A.P.C. Publication, Rocket Propelled Bodies, Ser. No. 159,143, June 8, 1943, Zwerina.

MILTON BUCHLER, *Primary Examiner.*

RICHARD A. DORNON, *Assistant Examiner.*

U.S. Cl. X.R.

60—219, 250; 89—1.806